US010102463B2

(12) United States Patent
Toyoizumi et al.

(10) Patent No.: US 10,102,463 B2
(45) Date of Patent: Oct. 16, 2018

(54) TWO-DIMENSIONAL CODE GENERATION DEVICE, TWO-DIMENSIONAL CODE GENERATION METHOD, AND NON-TRANSITORY COMPUTER-READABLE RECORDING MEDIUM

(71) Applicant: A.T Communications Co., Ltd., Taitou-ku, Tokyo (JP)

(72) Inventors: Hiroshi Toyoizumi, Tokyo (JP); Youichi Azuma, Tokyo (JP); Toshiki Nishiyama, Odawara (JP); Takuji Tokiwa, Noda (JP)

(73) Assignee: A.T Communications Co., Ltd., Tokyo (JP)

( * ) Notice: Subject to any disclaimer, the term of this patent is extended or adjusted under 35 U.S.C. 154(b) by 0 days.

(21) Appl. No.: 15/542,713

(22) PCT Filed: Jan. 13, 2015

(86) PCT No.: PCT/JP2015/050652
§ 371 (c)(1),
(2) Date: Jul. 11, 2017

(87) PCT Pub. No.: WO2016/113842
PCT Pub. Date: Jul. 21, 2016

(65) Prior Publication Data
US 2018/0025263 A1  Jan. 25, 2018

(51) Int. Cl.
*G06K 19/00* (2006.01)
*G06K 19/06* (2006.01)

(52) U.S. Cl.
CPC ... *G06K 19/06037* (2013.01); *G06K 19/0614* (2013.01)

(58) Field of Classification Search
USPC .................................. 235/435, 439, 454, 462
See application file for complete search history.

(56) References Cited

U.S. PATENT DOCUMENTS

| | | | |
|---|---|---|---|
| 2008/0002853 A1 | 1/2008 | Kawabe et al. | |
| 2011/0011926 A1 | 1/2011 | Matsumoto | |

(Continued)

FOREIGN PATENT DOCUMENTS

| | | |
|---|---|---|
| EP | 2555138 A1 | 6/2013 |
| JP | 433061 B1 | 6/2009 |

(Continued)

OTHER PUBLICATIONS

Extended European Search Report for European App. No. 15877797.9 dated Jan. 31, 2018.

*Primary Examiner* — Matthew Mikels
(74) *Attorney, Agent, or Firm* — K&L Gates LLP; Louis C. Cullman; Robert W. Winn (57) ABSTRACT

In a two-dimensional code generation device (100), a white point determiner (111) determines a white point in an environment to output a two-dimensional code. A threshold acquirer (112) acquires a threshold of lightness used by a reading device for reading multiple cells in binary, the threshold being represented in a device-independent color space that is based on the white point determined by the white point determiner (111). A two-dimensional code generator (113) generates a two-dimensional code expressing information by a distribution pattern of multiple cell dots formed by coloring the multiple cells in a color of lightness equal to or higher than the threshold acquired by the threshold acquirer (112) and in a color of lightness lower than the threshold.

8 Claims, 7 Drawing Sheets

(56) References Cited

U.S. PATENT DOCUMENTS

| | | | |
|---|---|---|---|
| 2012/0063676 A1 | 3/2012 | Kawabe et al. | |
| 2013/0021364 A1 | 1/2013 | Azuma et al. | |
| 2013/0026241 A1 | 1/2013 | Sakahashi et al. | |
| 2013/0153662 A1* | 6/2013 | Narasa Prakash ... | G06K 7/1486 235/462.07 |
| 2014/0326792 A1 | 11/2014 | Sakahashi et al. | |

FOREIGN PATENT DOCUMENTS

| | | |
|---|---|---|
| JP | 4781892 B1 | 7/2011 |
| JP | 2013-009387 A | 1/2013 |
| JP | 2013-080448 A | 5/2013 |
| WO | 2011118540 A1 | 9/2011 |

* cited by examiner

TWO-DIMENSIONAL CODE GENERATION DEVICE, TWO-DIMENSIONAL CODE GENERATION METHOD, AND NON-TRANSITORY COMPUTER-READABLE RECORDING MEDIUM

TECHNICAL FIELD

The present disclosure relates to a two-dimensional code generation device, a two-dimensional code generation method, and a program.

BACKGROUND ART

Two-dimensional codes expressing information by a distribution pattern of multiple cells arranged lengthwise and crosswise (in a matrix) and colored black and white are known. For example, it is possible to easily access various uniform resource locators (URLs) by reading two-dimensional codes with a reading device provided to cell-phones and the like. Two-dimensional codes can deal with a larger amount of information compared to one-dimensional bar codes and the like and therefore are used in various scenes of daily life.

Recently, with the addition of colors, shapes, and/or the like to two-dimensional codes, two-dimensional codes with designs have been known. For example, Patent Literature 1 and Patent Literature 2 disclose logo-included two-dimensional codes that can express digital information and visual information simultaneously by superimposing a two-dimensional code expressing information by a distribution pattern of cell dots formed by coloring multiple cells and a logomark visually expressing information. Having the logomark along with the digital information readable with a reading device, such logo-included two-dimensional codes enable information as to what company, organization, or the like the two-dimensional code represents and the like to be easily visually recognized by people who saw the two-dimensional codes.

CITATION LIST

Patent Literature

Patent Literature 1: Japanese Patent No. 4330601; and
Patent Literature 2: Japanese Patent No. 4781892.

SUMMARY OF INVENTION

Technical Problem

Two-dimensional codes are displayed on various display devices and printed on various print media. However, depending on the display device on which two-dimensional codes are displayed or the print medium on which two-dimensional codes are printed, there is a problem that the accuracy of reading two-dimensional codes with reading devices is unstable. Specifically, the reading devices not only require time and have difficulty in reading two-dimensional codes but also fail to read two-dimensional codes in some cases. Particularly, the accuracy of reading two-dimensional codes to which colors, shapes, and/or the like are added is more unstable compared to the accuracy of reading two-dimensional codes generated in patterns of only two colors such as black and white.

The reason for the above unstable accuracy of reading two-dimensional codes with reading devices is that the base white color varies depending on the environment to display or print the two-dimensional code. In other words, in the real life, there are many kinds of light sources and they are mixed. For example, even the same thing looks different in hue each time the light source is changed. Consequently, the accuracy of reading two-dimensional codes with reading devices is affected by the reading environment and/or the display device. Therefore, there is a demand for stable reading of two-dimensional codes in different environments.

The present disclosure is made with the view of the above actual situation and an objective of the disclosure is to provide a two-dimensional code generation device, two-dimensional code generation method, and program for generating two-dimensional codes that can be read stably by a reading device in various environments.

Solution to Problem

In order to achieve the above objective, the two-dimensional code generation device according to a first exemplary aspect of the present disclosure comprises:

white point determination means for determining a white point in an environment to output a two-dimensional code;

threshold acquisition means for acquiring a threshold of lightness used by a reading device for reading multiple cells in binary, the threshold being represented in a device-independent color space that is based on the white point determined by the white point determination means; and two-dimensional code generation means for generating the two-dimensional code expressing information by a distribution pattern of multiple cell dots formed by coloring the multiple cells in a color of lightness equal to or higher than the threshold acquired by the threshold acquisition means and in a color of lightness lower than the threshold.

The above two-dimensional code generation device may further comprise:

logo image acquisition means for acquiring a logo image, and lightness acquisition means for acquiring lightness of each part within the logo image when the logo image acquired by the logo image acquisition means is represented in the color space, wherein the two-dimensional code generation means may generate as the two-dimensional code a logo-included two-dimensional code on which the logo image is superimposed by superimposing cell dots colored in a color of lightness lower than the threshold on parts of the logo image that are superimposed on cells that are to be colored in a color of lightness lower than the threshold among the multiple cells and of which the lightness acquired by the lightness acquisition means is equal to or higher than the threshold, and superimposing cell dots colored in a color of lightness equal to or higher than the threshold on parts of the logo image that are superimposed on cells that are to be colored in a color of lightness equal to or higher than the threshold among the multiple cells and of which the lightness acquired by the lightness acquisition means is lower than the threshold.

In the above two-dimensional code generation device, the two-dimensional code generation means may generate the logo-included two-dimensional code by superimposing, on parts of the logo image that are superimposed on cells that are to be colored in a color of lightness lower than the threshold among the multiple cells and of which the lightness acquired by the lightness acquisition means is equal to or higher than the threshold, the cell dots smaller than the cells and colored in a color of lightness lower than the threshold, and superimposing, on parts of the logo image that are superimposed on cells that are to be colored in a color of lightness equal to or higher than the threshold among the multiple cells and of which the lightness acquired by the lightness acquisition means is lower than the threshold, the cell dots smaller than the cells and colored in a color of lightness equal to or higher than the threshold.

In the above two-dimensional code generation device, the two-dimensional code generation means may generate the logo-included two-dimensional code by superimposing the cell dots smaller than the cells and colored in a color of lightness lower than the threshold at positions of centers of the cells, and superimposing the cell dots smaller than the cells and colored in a color of lightness equal to or higher than the threshold at positions of centers of the cells.

The above two-dimensional code generation device may further comprise:

two-dimensional code conversion means for converting the two-dimensional code generated by the two-dimensional code generation means to a two-dimensional code represented in a color space of the environment to output the two-dimensional code.

In the above two-dimensional code generation device, the two-dimensional code conversion means may convert the two-dimensional code generated by the two-dimensional code generation means to a two-dimensional code represented in a color space for printing output when the two-dimensional code is output by printing, and the two-dimensional code generation device may further comprise halftone dot data generation means for generating halftone dot data expressing colors at positions within the two-dimensional code converted by the two-dimensional code conversion means by a size of halftone dots.

In the above two-dimensional code generation device, the halftone dot data generation means may generate the halftone dot data so that any halftone dot is positioned at a center of each cell that is to be colored in a color of lightness lower than the threshold among the multiple cells within the two-dimensional code converted by the two-dimensional code conversion means.

In order to achieve the above objective, the two-dimensional code generation method according to a second exemplary aspect of the present disclosure comprises:

a white point determination step of determining a white point in an environment to output a two-dimensional code;

a threshold acquisition step of acquiring a threshold of lightness used by a reading device for reading multiple cells in binary, the threshold being represented in a device-independent color space that is based on the white point determined by the white point determination step; and a two-dimensional code generation step of generating the two-dimensional code expressing information by a distribution pattern of multiple cell dots formed by coloring the multiple cells in a color of lightness equal to or higher than the threshold acquired by the threshold acquisition step and in a color of lightness lower than the threshold.

In order to achieve the above objective, the program according to a third exemplary aspect of the present disclosure makes a computer execute:

a white point determination procedure to determine a white point in an environment to output a two-dimensional code;

a threshold acquisition procedure to acquire a threshold of lightness used by a reading device for reading multiple cells in binary, the threshold being represented in a device-independent color space that is based on the white point determined by the white point determination procedure; and a two-dimensional code generation procedure to generate the two-dimensional code expressing information by a distribution pattern of multiple cell dots formed by coloring the multiple cells in a color of lightness equal to or higher than the threshold acquired by the threshold acquisition procedure and in a color of lightness lower than the threshold.

Advantageous Effects of Invention

The present disclosure can provide a two-dimensional code generation device, two-dimensional code generation method, and program for generating two-dimensional codes that can be read stably by a reading device in various environments.

DESCRIPTION OF EMBODIMENTS

An embodiment for implementing the present disclosure will be described below.

The two-dimensional code generation device according to this embodiment will be described with reference to the drawings.

The two-dimensional code generation device according to this embodiment generates a two-dimensional code expressing information by multiple cells arranged in a matrix. The two-dimensional code is a code in a display format capable of carrying information in two directions, lengthwise and crosswise, such as the quick response (QR) code (registered trademark). The information expressed by the two-dimensional code is, for example, management information of a product or an article of commerce, a uniform resource locator (URL) to access with a cell-phone, information used as a cash voucher, a coupon, or the like, and the like.

Figure 1:
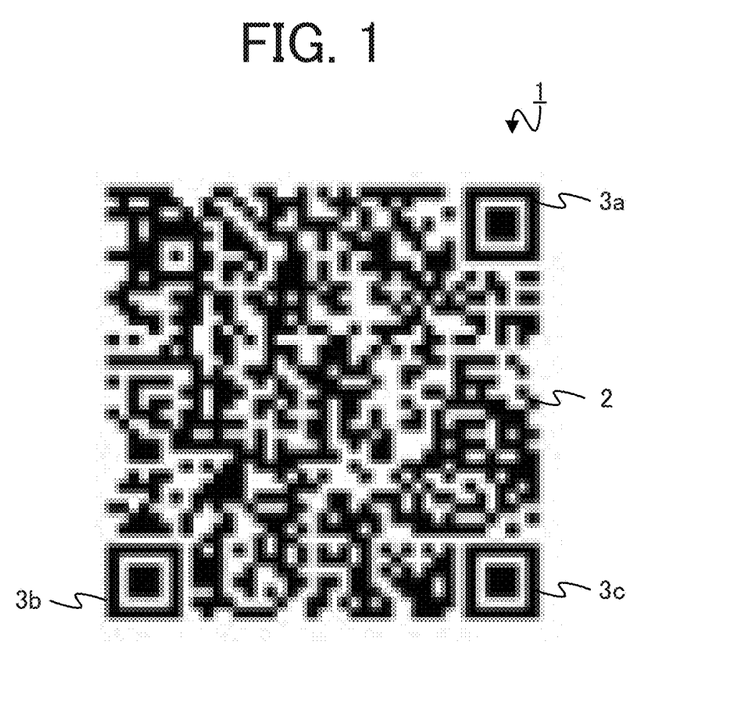
FIG. 1 is a plane view showing an exemplary two-dimensional code.

FIG. 1 shows an exemplary two-dimensional code. As shown in FIG. 1, a two-dimensional code 1 has multiple cells 2 arranged in a matrix. Specifically, the multiple cells 2 are each a square of a specific size (for example, 4 mm square) and arranged in predetermined quantities lengthwise and crosswise.

The multiple cells 2 are colored either in a color of lightness lower than a predetermined threshold (black in the example of FIG. 1) or in a color of lightness equal to or higher than the threshold (white in the example of FIG. 1). Here, the threshold is the lightness corresponding to a boundary value according to which the cells 2 are read as "1" or as "0" when a reading device reads the two-dimensional code 1. The reading device of the two-dimensional code 1 reads, for example, the cells 2 colored in a color of lightness lower than the threshold as "1" and reads the cells 2 colored in a color of lightness equal to or higher than the threshold as "0."

In the following explanation, the cells 2 colored either in a color of lightness lower than the threshold or in a color of lightness equal to or higher than the threshold are termed cell dots. The two-dimensional code 1 expresses various kinds of information in binary using a distribution pattern of cell dots formed by coloring the multiple cells 2 in a color of lightness lower than the threshold or in a color of lightness equal to or higher than the threshold as just stated.

Three positioning symbols 3a, 3b, and 3c are placed at three different corners in the two-dimensional code 1. The three positioning symbols 3a, 3b, and 3c serve as the reference for the reading device to be able to detect the position and orientation of the two-dimensional code 1. Such three positioning symbols 3a, 3b, and 3c are distinguished from the other cells by arranging multiple cells 2 in a distribution pattern comprising a combination of squares of specific ratios.

Figure 2:
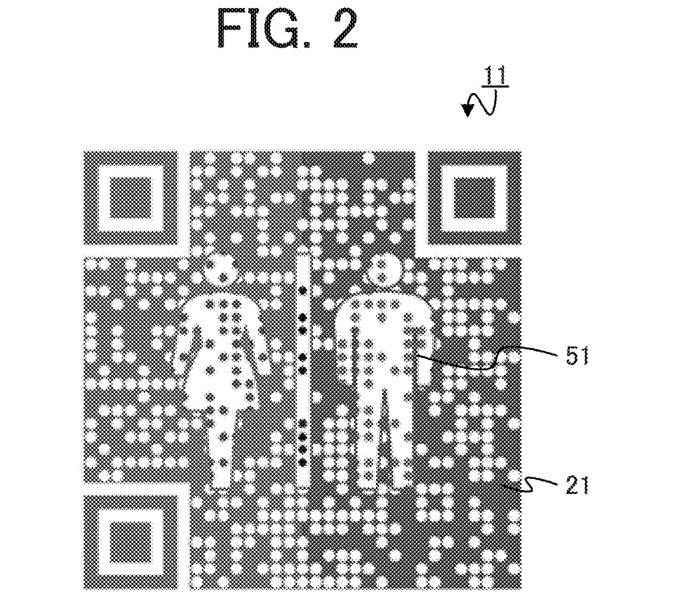
FIG. 2 is a plane view showing a first exemplary logo-included two-dimensional code.
Figure 3:
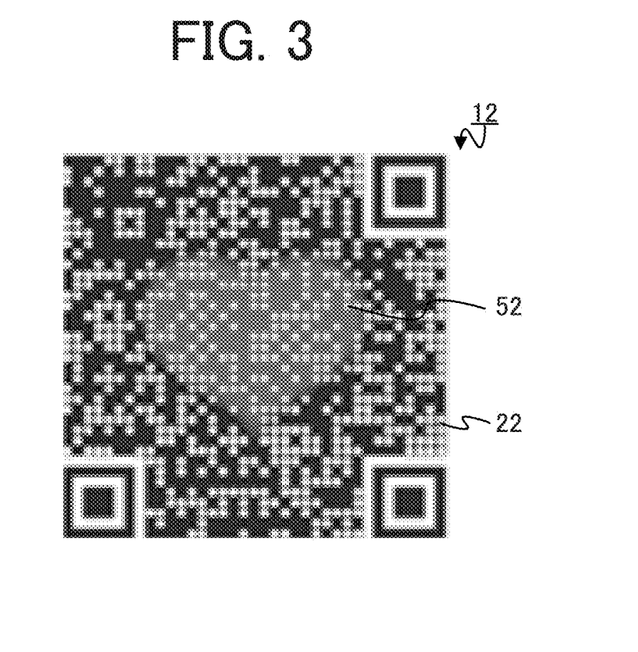
FIG. 3 is a plane view showing a second exemplary logo-included two-dimensional code.
Figure 4:
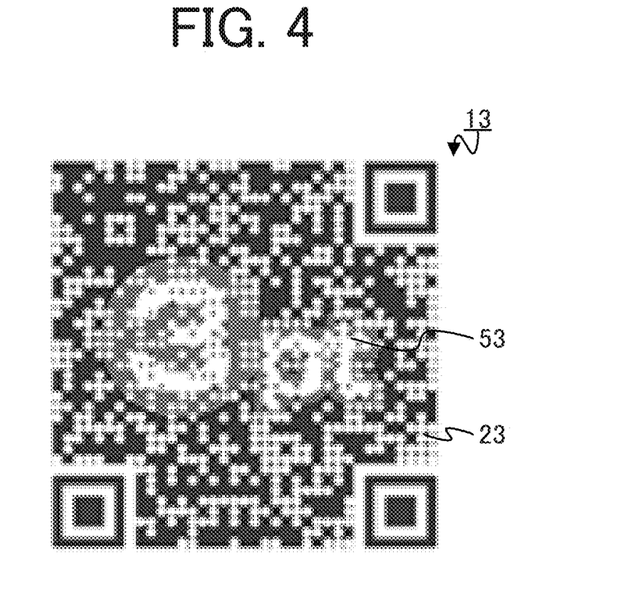
FIG. 4 is a plane view showing a third exemplary logo-included two-dimensional code.

Next, FIGS. 2 to 4 show exemplary logo-included two-dimensional codes. A logo-included two-dimensional code is a two-dimensional code designed with a logomark expressing a figure, a character, a symbol, a graphic, or the like and superimposed on multiple cells.

A logo-included two-dimensional code 11 shown in FIG. 2 is formed by superimposing a logomark 51 expressing a human-shaped figure on multiple cells 21 arranged in a matrix.

A logo-included two-dimensional code 12 shown in FIG. 3 is formed by superimposing a logomark 52 expressing a heart-shaped figure on multiple cells 22 arranged in a matrix.

A logo-included two-dimensional code 13 shown in FIG. 4 is formed by superimposing a logomark 53 expressing characters "3pt" on multiple cells 23 arranged in a matrix.

Since the two-dimensional code 1 shown in FIG. 1 basically comprises a combination of black and white, what information the code expresses is incomprehensible to the eye. On the other hand, since the logomarks 51, 52, and 53 visually expressing information are superimposed on the multiple cells 21, 22, and 23, the logo-included two-dimensional codes 11, 12, and 13 shown in FIGS. 2 to 4 are codes capable of expressing digital information and visual information simultaneously. Although shown in the gray scale in FIGS. 2 to 4, it is preferable that such logo-included two-dimensional codes 11, 12, and 13 are in full color for enhancing the design or from the viewpoint of forgery prevention and the like.

As shown in FIG. 2, the logo-included two-dimensional code 11 has the logomark 51 consisting mainly of a human-shaped figure of two people. The inside of the logomark 51 is colored white, namely in a color of lightness equal to or higher than the threshold of the reading device.

In order for the logo-included two-dimensional code 11 including the part of the above logomark 51 to be read correctly by the reading device, cell dots colored in a color of lightness lower than the threshold (black or gray) are superimposed on the logomark 51 in the parts of the logomark 51 that are superimposed on the cells 21 that are to be colored in a color of lightness lower than the threshold. On the other hand, no cell dots are superimposed on the logomark 51 in the parts of the logomark 51 that are superimposed on the cells 21 that are to be colored in a color of lightness equal to or higher than the threshold because the reading device can read correct information by reading the color (white) of the logomark 51 as it is. As just stated, the logo-included two-dimensional code 11 expresses information on the logomark 51 by the cell dots superimposed on the logomark 51 and colored in a color of lightness lower than the threshold (black or gray) and the logomark 51 itself having a color of lightness equal to or higher than the threshold (white).

As shown in FIG. 3, the logo-included two-dimensional code 12 has the logomark 52 expressing a heart-shaped figure. The inside of the logomark 52 is colored dark gray, namely in a color of lightness lower than the threshold of the reading device.

In order for the logo-included two-dimensional code 12 including the part of the above logomark 52 to be read correctly by the reading device, cell dots colored in a color of lightness equal to or higher than the threshold (white) are superimposed on the logomark 52 in the parts of the logomark 52 that are superimposed on the cells 22 that are to be colored in a color of lightness equal to or higher than the threshold. On the other hand, no cell dots are superimposed on the logomark 52 in the parts of the logomark 52 that are superimposed on the cells 22 that are to be colored in a color of lightness lower than the threshold because the reading device can read correct information by reading the color (dark gray) of the logomark 52 as it is. As just stated, the logo-included two-dimensional code 12 expresses information on the logomark 52 by the cell dots superimposed on the logomark 52 and colored in a color of lightness equal to or higher than the threshold (white) and the logomark 52 itself having a color of lightness lower than the threshold (dark gray).

As shown in FIG. 4, the logo-included two-dimensional code 13 has the logomark 53 expressing the characters "3pt." Of the logomark 53, the character parts "3pt" are colored white, namely in a color of lightness equal to or higher than the threshold of the reading device, and the parts surrounding the characters "3pt" are colored gray, namely in a color of lightness lower than the threshold of the reading device.

In order for the logo-included two-dimensional code 13 including the parts of the above logomark 53 to be read correctly by the reading device, cell dots colored in a color of lightness lower than the threshold (black) are superimposed on the logomark 53 in the parts of the white character parts of the logomark 53 that are superimposed on the cells 23 that are to be colored in a color of lightness lower than the threshold. Furthermore, cell dots colored in a color of lightness equal to or higher than the threshold (white) are superimposed on the logomark 53 in the parts of the gray surrounding parts of the logomark 53 that are superimposed on the cells 23 that are to be colored in a color of lightness equal to or higher than the threshold. On the other hand, no cell dots are superimposed on the logomark 53 in the parts of the white character parts of the logomark 53 that are superimposed on the cells 23 that are to be colored in a color of lightness equal to or higher than the threshold because the reading device can read correct information by reading the color (white) of the logomark 53 as it is. Similarly, no cell dots are superimposed on the logomark 53 in the parts of the gray surrounding parts of the logomark 53 that are superimposed on the cells 23 that are to be colored in a color of lightness lower than the threshold because the reading device can read correct information by reading the color (gray) of the logomark 53 as it is. As just stated, the logo-included two-dimensional code 13 expresses information on the logomark 53 by the cell dots superimposed on the logomark 53 and colored in a color of lightness equal to or higher than the threshold (white), the cell dots superimposed on the logomark 53 and colored in a color of lightness lower than the threshold (black), and the logomark 53 itself having the parts in a color of lightness equal to or high than the threshold (the white character parts) and the parts in a color of lightness lower than the threshold (the gray surrounding parts).

Here, in the logo-included two-dimensional codes 11, 12, and 13 shown in FIGS. 2 to 4, the cell dots superimposed on the logomarks 51, 52, 53 are circular, not square like the cells. The center of a circular cell dot coincides with the center of the square cell and the cell dot is smaller in area than the cell. Then, the part excluding the circular cell dot within a cell is colored in the color of the logomark 51, 52, or 53.

The reading device reads the center part of each cell in reading a two-dimensional code such as the logo-included two-dimensional codes 11, 12, and 13. Therefore, as described in the above Patent Literature 1, even if the colored area of a cell dot colored in a color of lightness lower than the threshold is smaller than the area of a cell and the cell dot has a shape other than a square, the reading device reads a value closer to "1" to some extent (a value recognized as black). Similarly, even if the colored area of a cell dot colored in a color of lightness equal to or higher than the threshold is smaller than the area of a cell and the cell dot has a shape other than a square, the reading device reads a value closer to "0" to some extent (a value recognized as white). Therefore, with the cell dot being formed around the center part of each cell, even if the cell dot is smaller in area than the cell, there will be no problem with reading of a two-dimensional code by the reading device. Specifically, when a cell dot is formed around the center part of each cell, a two-dimensional code can easily be read by the reading device if the colored area of a cell dot occupies 3% (more preferably 20%) or more of the area of a cell.

Figure 5:
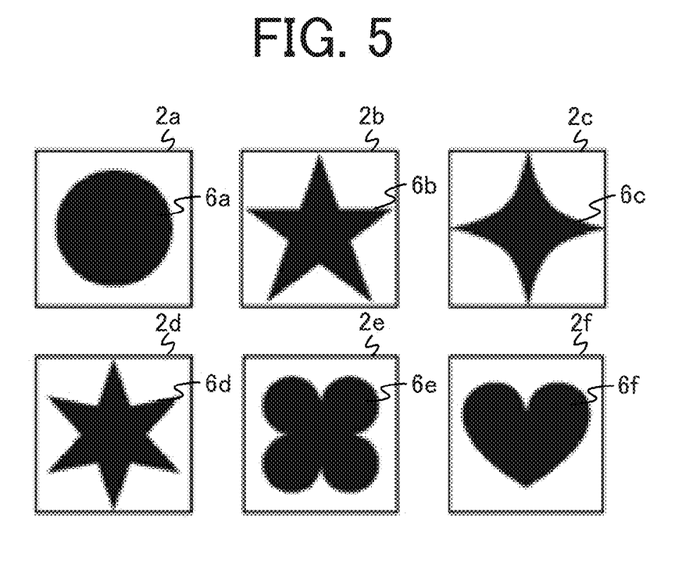
FIG. 5 is an illustration showing exemplary cell dots.

FIG. 5 shows exemplary cell dots in various shapes. The cell dots of the logo-included two-dimensional codes 11, 12, and 13 shown in FIGS. 2 to 4 correspond to a circular cell dot 6a provided in a square cell 2a shown in FIG. 5. Besides the circular cell dot 6a, cell dots in various shapes such as cell dots 6b to 6f in the shapes of a star, a heart, or the like provided in cells 2b to 2f can be used in accordance with the design of a logo image superimposed on a two-dimensional code. The reading device can read information from the distribution pattern of the cell dots 6a to 6f in various shapes such as the shapes of a circle, a polygon, a heart, or the like as exemplified in FIG. 5.

It is possible to suppress erosion of the logomarks 51, 52, and 53 by the cell dots by making the cell dots smaller in area than the cells while assuring the normal function of reading the logo-included two-dimensional codes 11, 12, and 13 of the reading device as described above and expressing the part within a cell excluding the cell dot in a color of the logomark 51, 52, or 53. Thus, it is possible to easily visually recognize the logomarks 51, 52, and 53 and prevent deterioration in design of the logomarks 51, 52, and 53.

Figure 6:
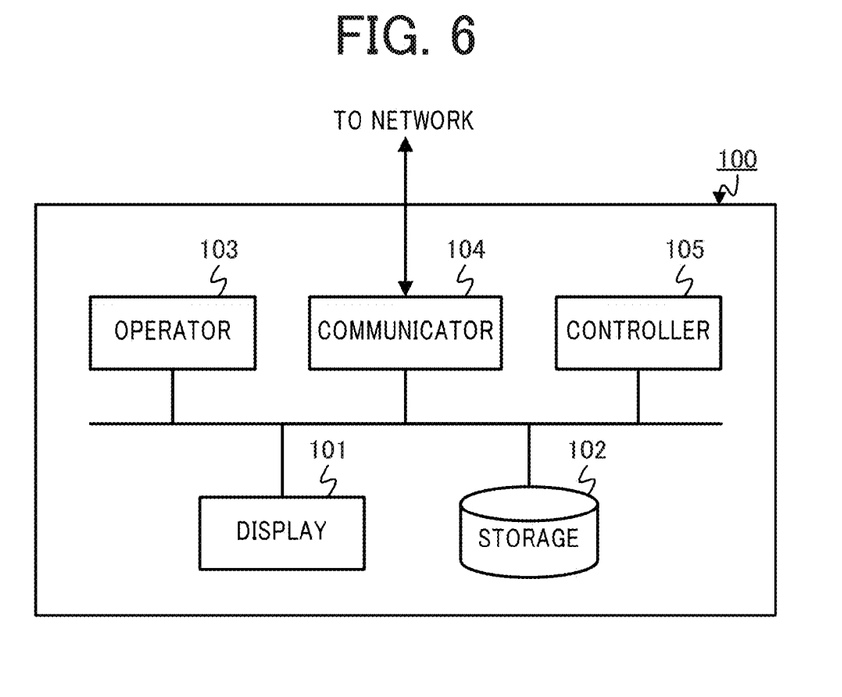
FIG. 6 is a block diagram showing an exemplary configuration of the two-dimensional code generation device according to an embodiment of the present disclosure.

The two-dimensional code generation device generating the above-described two-dimensional code 1 and logo-included two-dimensional codes 11, 12, and 13 is configured as shown in FIG. 6. A two-dimensional code generation device 100 comprises a display 101, a storage 102, an operator 103, a communicator 104, and a controller 105. These parts are mutually connected via a bus. The two-dimensional code generation device 100 is realized by, for example, a general-purpose computer.

The display 101 is configured by, for example, a liquid crystal display (LCD) or the like. The display 101 displays various images under the control of the controller 105. For example, the display 101 displays two-dimensional codes generated by the two-dimensional code generation device 100, logo images to be superimposed on the two-dimensional codes, and the like.

The storage 102 is configured by a nonvolatile memory, for example a hard drive, a flash memory, or the like. The storage 102 stores various kinds of information and various kinds of programs necessary for the procedures executed by the two-dimensional code generation device 100.

The operator 103 is operated by the user and configured by, for example, a keyboard, a mouse, and the like. For example, the user operates the operator 103 to enter an order to generate a two-dimensional code and the like.

The communicator 104 is configured by, for example, a wireless communication device or the like, and connected to a network. The communicator 104 receives from an external device data necessary for the two-dimensional code generation device 100 to generate a two-dimensional code and transmits the two-dimensional code generated by the two-dimensional code generation device 100 to an external device under the control of the controller 5.

The controller 105 is configured by, for example, a central processing unit (CPU), a read only memory (ROM), a random access memory (RAM), and the like. The controller 105 controls operations of the parts of the two-dimensional code generation device 100 by the CPU executing various kinds of programs stored in the ROM, the storage 102, and/or the like as appropriate using the RAM as the work memory.

Figure 7:
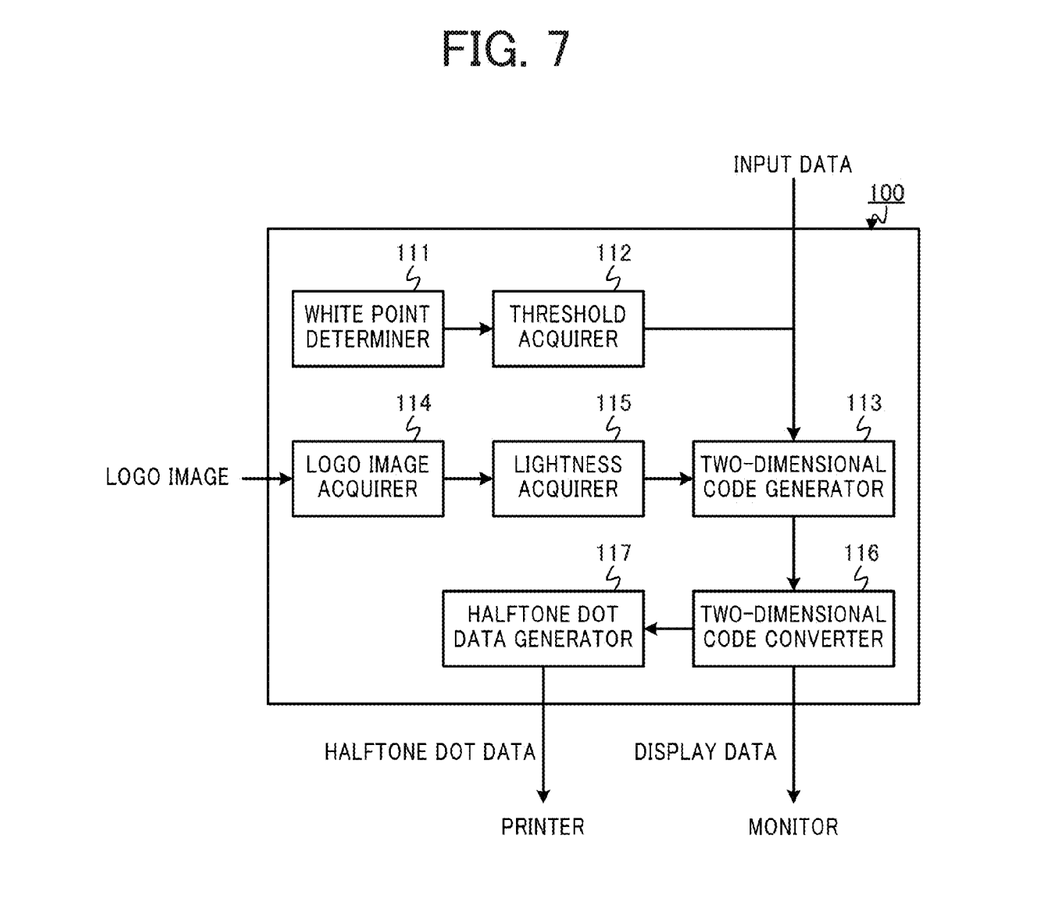
FIG. 7 is a functional block diagram of the two-dimensional code generation device according to the embodiment of the present disclosure.

As shown in FIG. 7, the two-dimensional code generation device 100 functionally comprises a white point determiner 111, a threshold acquirer 112, a two-dimensional code generator 113, a logo image acquirer 114, and a lightness acquirer 115. The controller 105 functions as these parts in cooperation with the CPU, the ROM, the RAM, and the like.

The white point determiner 111 determines a white point in an environment to output a two-dimensional code generated by the two-dimensional code generation device 100.

The white color is a color that is the basis for color creation. Therefore, the color of output data (a two-dimensional code) is created based on the white color in both displaying on a monitor of a personal computer (PC) or the like and printing with a printer the two-dimensional code generated by the two-dimensional code generation device 100.

For example, when a two-dimensional code is displayed on a monitor of a PC or the like, the white color on the monitor is expressed by 100% emission of all the light sources for red, green, and blue (RGB) colors. Then, the other colors are expressed by adjusting the emission intensities of the RGB light sources between 0% and 100%. Therefore, if the white color varies depending on the monitor, the colors other than the white also vary. This is a reason that the user cannot obtain a desired hue.

On the other hand, also when a two-dimensional code is printed with a printer, the base white color varies depending on the recording medium material such as paper and film on which the two-dimensional code is printed. For example, even when the recording medium on which a two-dimensional code is printed is paper, copier paper, cardboard, newspaper, magazines, and the like are all different in paper color. Therefore, it is necessary to properly set the base white color according to the recording medium material for printing a two-dimensional code in a hue the user desires.

In other words, it is necessary to precisely match the white color in the environment to generate a two-dimensional code with the white color in the environment to output the two-dimensional code (calibration) in both displaying on a monitor and printing with a printer a two-dimensional code. To this end, the white point determiner 111 determines a proper white point according to the device to which the generated two-dimensional code is output. As a result, white balance is adjusted.

In specific explanation, the white point determiner 111 sets a color temperature as the white point in the environment to output a two-dimensional code. For example, the white point determiner 111 sets as the white point a color temperature entered by the user via the operator 103. Alternatively, the white point determiner 111 can acquire information indicating the environment to output a two-dimensional code (an OS or the like in the case of displaying and a recording medium type or the like in the case of printing), and set as the white point a color temperature suitable for the environment from the acquired information or the like.

The color temperature is an indicator for expressing hues used in a device dealing with the color such as monitors and printers. The unit of the color temperature is kelvin (K). For example, in displaying an image on a monitor, the entire monitor is displayed bluish when the color temperature is high and the entire monitor is displayed reddish when the color temperature is low. In other words, the white color displayed on a monitor of a high color temperature and the white color displayed on a monitor of a low color temperature are different.

For example, the color temperature called page-white is 5000 K (D50). Moreover, the color temperature of a monitor is set to a default of 6500 K (D65), 9300 K (D93), or the like depending on the operating system (OS) used. The monitors deteriorate with time and the actual color temperature may not equal to the set value. In such a case, the color temperature of the monitor may be measured using a measuring device or the like. As a result, the white point determiner 111 can determine the white point with accuracy.

The threshold acquirer 112 acquires a threshold of lightness used by a two-dimensional code reading device for reading multiple cells in binary, the threshold being represented in a color space that is based on the white point determined by the white point determiner 111.

A case in which a color temperature of 6500 K (D65) is adopted will be described below. In such a case, the threshold acquirer 112 adopts a device-independent color space supporting the color temperature of 6500 K (D65). Specifically, the threshold acquirer 112 adopts the standard RGB (sRGB) color space as the device-independent color space when the color temperature is 6500 K (D65). The sRGB is a standard adopted for precisely reproducing the colors regardless of difference in device in conventional monitors, printers, digital cameras, and the like. The threshold acquirer 112 determines a threshold for a two-dimensional code reading device to read each of multiple cells in binary in color regions in the adopted sRGB color space.

A two-dimensional code reading device judges whether to read a cell as "1" or as "0" with information of the lightness. In other words, the reading device reads a cell as "1" even if the cell is in a color other than black as long as the cell is colored in a color of lightness lower than the threshold (namely, a relatively dark color). Similarly, the reading device reads a cell as "0" even if the cell is in a color other than white as long as the cell is colored in a color of lightness equal to or higher than the threshold (namely, a relatively bright color).

Figure 8:
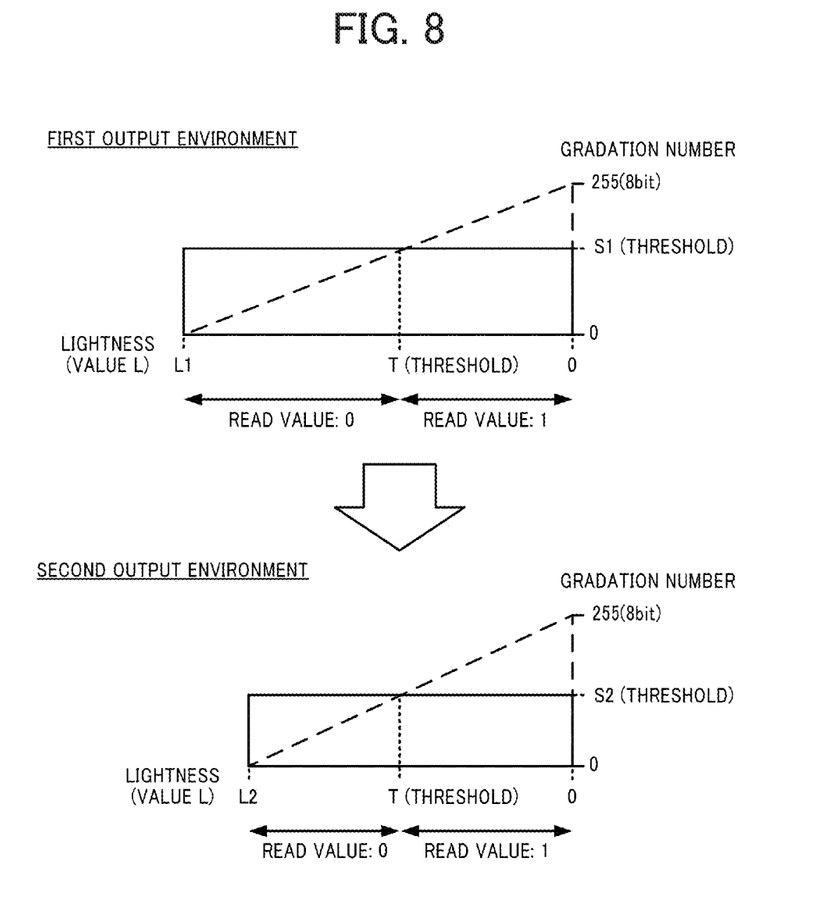
FIG. 8 is a chart showing an exemplary threshold in different output environments.

More detailed explanation will be made with reference to FIG. 8. In FIG. 8, the lightness (value L) is shown in the horizontal direction and the gradation number corresponding to the lightness on an output device (a monitor, a printer, or the like) is shown in the vertical direction. For example, in a first output environment to output a two-dimensional code generated by the two-dimensional code generation device 100, the lightness between 0 and the maximum lightness L1 (the lightness corresponding to the white color) is expressed by 256 gradations (eight bits). Specifically, the lightness 0 corresponds to the gradation 255 and the lightness L1 corresponds to the gradation 0. The maximum lightness L1 is determined by the white point (the color temperature) in the first output environment. The lightness corresponding to the threshold of the reading device is expressed by T. Then, the reading device reads a cell colored in a color of lightness between 0 and T as "1" and reads a cell colored in a color of lightness between T and L1 as "0" in the first output environment. The gradation number corresponding to the lightness of the threshold T is expressed by S1. In the first output environment, the threshold acquirer 112 acquires the gradation number S1 as the threshold of the reading device, the threshold being represented in a device-independent color space that is based on the white point determined by the white point determiner 111.

On the other hand, in the case of outputting a two-dimensional code in a second output environment different from the first output environment, the maximum lightness changes to L2 different from L1 as shown in FIG. 8 according to the white point (the color temperature) in the second output environment. On the other hand, the lightness corresponding to the threshold of the reading device does not change from T. The reading device reads a cell colored in a color of lightness between 0 and T as "1" and reads a cell colored in a color of lightness between T and L2 as "0" in the second output environment.

In other words, since the maximum lightness changes from L1 to L2, the ratio between the range of lightness read as "0" and the range of lightness read as "1" changes from the ratio in the first output environment. Therefore, the gradation number S2 corresponding to the lightness of the threshold T changes to a value different from the gradation number S1 corresponding to the lightness of the threefold T in the first output environment. In the second output environment, the threshold acquirer 112 acquires the gradation number S2 as the threshold of the reading device, the threshold being represented in a device-independent color space that is based on the white point determined by the white point determiner 111.

As described above, the relative value of the lightness corresponding to the threshold T with respect to the lightness of the white color varies depending on the output environment. Therefore, even of the same two-dimensional code, particularly when a logomark is added and the two-dimensional code has various colors, whether the lightness of a cell is lower than a threshold or equal to or higher than a threshold is altered depending on the output environment, and the reading device may fail to read the two-dimensional code correctly.

In order to prevent the above matter, the two-dimensional code generator 113 generates a two-dimensional code expressing information by a distribution pattern of multiple cell dots formed by coloring multiple cells, on the basis of the threshold acquired by the threshold acquirer 112, in a color of lightness equal to or high than the threshold and in a color of lightness lower than the threshold.

In specific explanation, the two-dimensional code generator 113 acquires input data such as numbers, letters, symbols, and the like to generate a two-dimensional code. The two-dimensional code generator 113 acquires the input data by, for example, receiving an input order from the user via the operator 103 or receiving the input data from an external device via the communicator 104. Then, the two-dimensional code generator 113 generates a distribution pattern corresponding to the acquired input data and colors multiple cells in a color of lightness equal to or high than the threshold and in a color of lightness lower than the threshold according to the generated distribution pattern to generate a two-dimensional code expressing the acquired input data as information.

The two-dimensional code generator 113 can use as a color of lightness lower than a threshold, besides black, any color other than black as long as its lightness is lower than the threshold (a relatively dark color). Similarly, the two-dimensional code generator 113 can use as a color of lightness equal to or higher than a threshold, besides white, any color other than white as long as its lightness is equal to or higher than the threshold (a relatively bright color). The two-dimensional code generator 113 determines the color to color a cell by judging whether it is lower than the threshold or equal to or higher than the threshold in the adopted color space, whereby it is possible to prevent a reading device from failing to read the two-dimensional code correctly as a result of whether the lightness of a cell is lower than a threshold or equal to or higher than the threshold being altered depending on the output environment. In other words, it is possible to generate a two-dimensional code that is read correctly according to the environment to output the two-dimensional code.

The logo image acquirer 114 acquires a logo image. A logo image means image data of a logomark added to a two-dimensional code when a two-dimensional code is generated as a logo-included two-dimensional code. The logo image acquirer 114 acquires a logo image by, for example, receiving an input order from the user via the operator 103 or receiving the logo image from an external device via the communicator 104. Alternatively, when a logo image is prestored in the storage 102, the logo image acquirer 114 acquires the logo image from the storage 102.

The lightness acquirer 115 acquires the lightness of parts within the logo image when the logo image acquired by the logo image acquirer 114 is represented in the color space adopted by the threshold acquirer 112.

In specific explanation, when the acquired logo image is represented in a cyan, magenta, yellow, and black (CMYK) color space or an RGB color space other than the sRGB color space (a wide-gamut RGB color space or the like), the lightness acquirer 115 converts the acquired logo image to a logo image represented in the sRGB color space. This is because the CMYK color space generally used in printing and the RGB color space used in monitor display are device-dependent color spaces in which the colors are set differently for each device and the lightness cannot be acquired directly. Therefore, when the logo image is represented in a device-dependent color space, the lightness acquirer 115 converts the pixel values of the logo image to the values in the sRGB color space that is a device-independent color space (the absolute color space).

The color space conversion is conducted using, for example, a profile prescribing characteristics of the color space of each device such as a profile prescribed by the international color consortium (ICC) according to the color management system in compliance with the ICC.

After converting the color space, the lightness acquirer 115 converts the logo image represented in the sRGB color space to a logo image represented in the Lab color space. The Lab color space is a color space in which a color is represented with a value L indicating the lightness and values a and b indicating color difference information. The lightness acquirer 115 acquires the lightness of parts within the logo image by acquiring the value L of parts within the logo image represented in the Lab color space.

The two-dimensional code generator 113 generates a logo-included two-dimensional code by superimposing the logo image acquired by the logo image acquirer 114 on multiple cells constituting a two-dimensional code.

In specific explanation, the lightness of parts within the logo image acquired by the lightness acquirer 115 and the threshold of the reading device acquired by the threshold acquirer 112 are compared. Then, cell dots colored in a color of lightness lower than the threshold are superimposed on the parts of the logo image that are superimposed on the cells that are to be colored in a color of lightness lower than the threshold among multiple cells and of which the lightness acquired by the lightness acquirer 115 is equal to or higher than the threshold. Moreover, cell dots colored in a color of lightness equal to or higher than the threshold are superimposed on the parts of the logo image that are superimposed on the cells that are to be colored in a color of lightness equal to or higher than the threshold among multiple cells and of which the lightness acquired by the lightness acquirer 115 is lower than the threshold. At this point, using (for example, circular) cell dots smaller than the cells as the cell dots, erosion of the logo image by the cell dots can be suppressed. As a result, the lightness acquirer 115 generates, for example, the logo-included two-dimensional codes 11, 12, and 13 on which the logomarks 51, 52, and 53 are superimposed as shown in FIGS. 2 to 4.

The two-dimensional code converter 116 converts the two-dimensional code generated by the two-dimensional code generator 113 to a two-dimensional code represented in the color space of the environment to output the two-dimensional code. In other words, the two-dimensional code generated by the two-dimensional code generator 113 is the one generated in the Lab color space and therefore, the two-dimensional code converter 116 converts the two-dimensional code generated in the Lab color space to a two-dimensional code represented in the color space of a device to output the two-dimensional code (color separation).

In specific explanation, when the generated two-dimensional code is output by display on a monitor of a PC or the like, the two-dimensional code converter 116 converts the generated two-dimensional code to a two-dimensional code represented in a display output color space (for example, an RGB color space). Then, display data including the converted two-dimensional code are transmitted to the monitor to display the two-dimensional code. On the other hand, when the generated two-dimensional code is output by printing with a printer, the two-dimensional code converter 116 converts the generated two-dimensional code to a two-dimensional code represented in a color space for printing output (for example, a CMYK color space).

When the generated two-dimensional code is output by printing with a printer, the halftone dot data generator 117 generates halftone dot data expressing the color at each position within the two-dimensional code converted by the two-dimensional code converter 116 by the size of halftone dots.

In other words, in general printing, patterns of small dots called halftone dots are arranged on a recording medium to record a printed image on the recording medium. The tone and/or shade of a color is expressed by adjusting the size of halftone dots. Generally, in color printing, a desired color is reproduced by printing halftone dots of four colors, cyan, magenta, yellow, and black, at proper densities. Moreover, in color printing, halftone dots are generated with the screen angles of the colors shifted so that the moire is less visible. The halftone dot data generator 117 generates halftone dot data expressing the colors of the cells and the logo image by such halftone dots and transmits the generated halftone dot data to the printer.

Figure 9:
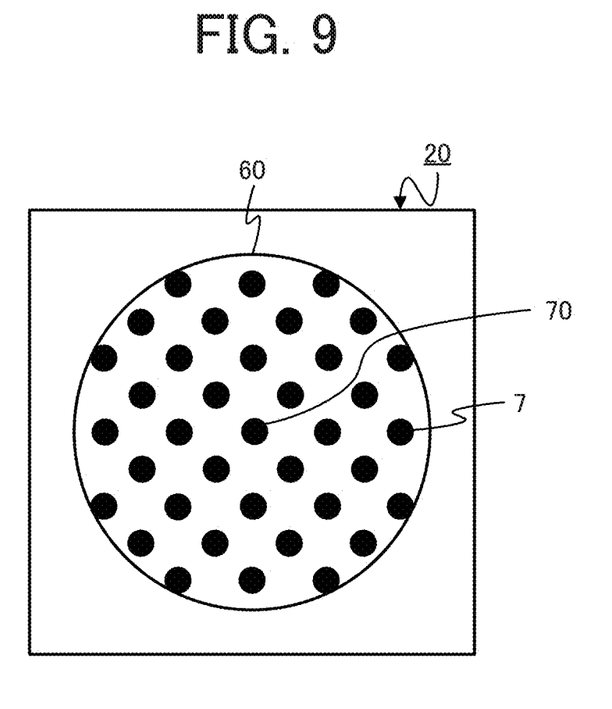
FIG. 9 is an illustration showing exemplary halftone dots placed in a cell.

FIG. 9 shows exemplary halftone dots 7 generated on a cell 20. The halftone dot data generator 117 places a number of small dots as the halftone dots 7 to express a circular cell dot 60 that is to be colored in a color of lightness lower than the threshold within the cell 20. On the other hand, the halftone dot data generator 117 does not place the halftone dots 7 in a region that is to be kept white such as the region other than the cell dot 60 within the cell 20. In FIG. 9, only the halftone dots 7 in one color (black) are displayed for easier understanding. However, in the case of color printing, halftone dots of four colors, cyan, magenta yellow, and black, are generated on the cell 20. Moreover, the ratio in size between the cell 20 and the halftone dots 7 in FIG. 9 is not necessarily consistent with the actual ratio in size.

As described above, the reading device reads the center part of each cell to judge whether it is "0" or "1." Consequently, in the case of expressing the color of the cell 20 that is to be colored in a color of lightness lower than the threshold (black or the like) by halftone dots, the accuracy of reading the cell 20 is improved when, in addition to the cell dot 60 itself being positioned in the center of the cell 20, any halftone dot 7 (a halftone dot 70 shown in FIG. 9) among the halftone dots 7 placed in the cell dot 60 is positioned at the center of the cell 20 compared to when no halftone dot 7 is positioned at the center of the cell 20.

Therefore, the halftone dot data generator 117 generates halftone dot data so that any halftone dot is positioned at the center of each cell that is to be colored in a color of lightness lower than the threshold among multiple cells within the two-dimensional code converted by the two-dimensional code converter 116. Moreover, cells that are to be colored in a color of lightness equal to or higher than the threshold (white or the like) are considered to less affect the reading accuracy of the reading device. Therefore, a halftone dot may be positioned at the center of each cell or a halftone dot may not be positioned at the center of each cell.

The procedure executed by the two-dimensional code generation device 100 comprising the above configuration will be described next with reference to the flowchart shown in FIG. 10.

Figure 10:
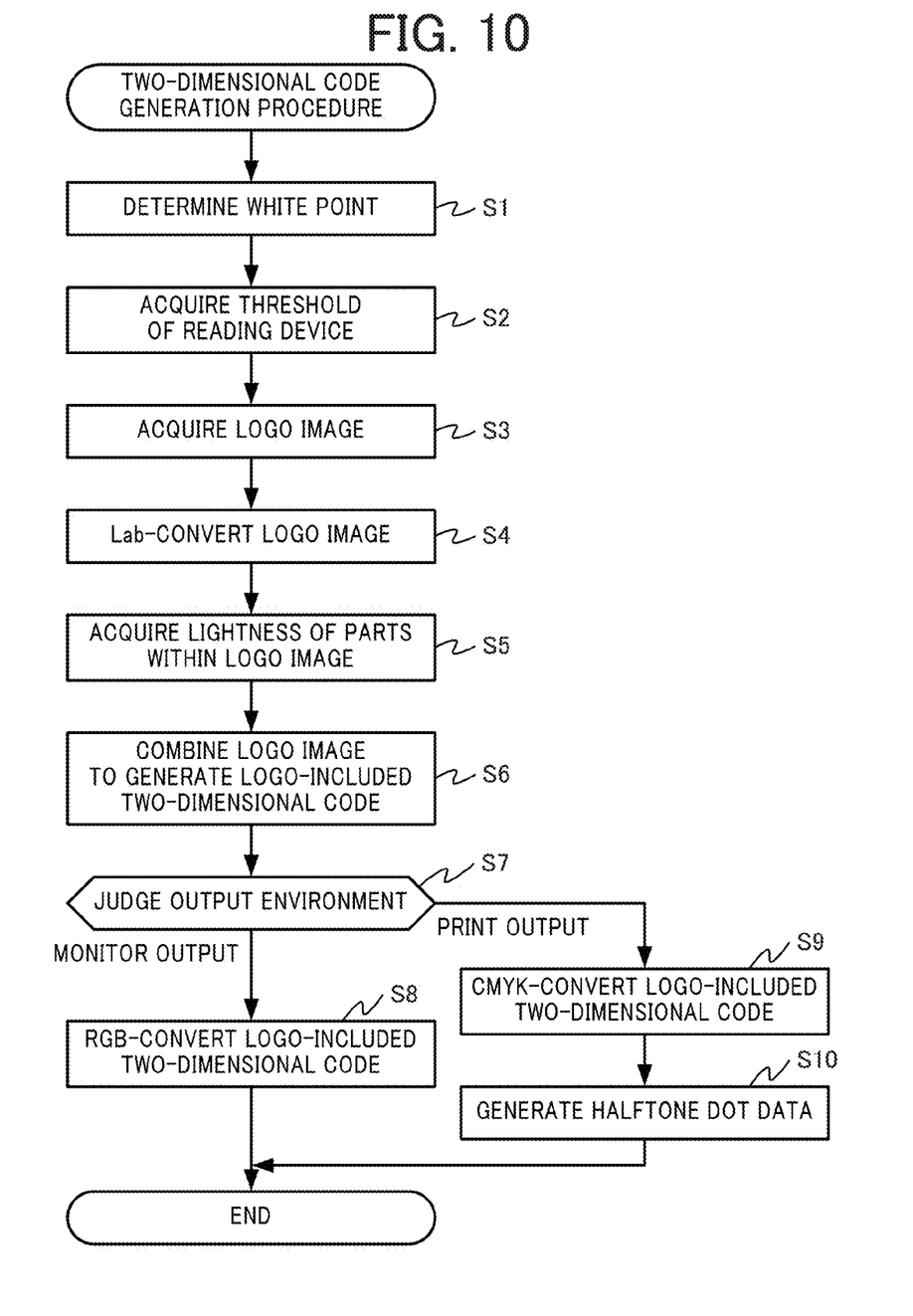
FIG. 10 is a flowchart showing an example of the two-dimensional code generation procedure executed by the two-dimensional code generation device according to the embodiment of the present disclosure.

The two-dimensional code generation device 100 starts the two-dimensional code generation procedure shown in FIG. 10 in response to an order to generate a two-dimensional code after, for example, input data such as numbers, letters, symbols, and the like are entered and the number of cells constituting a two-dimensional code and the shape, size, and the like of cell dots are specified by the user via the operator 103.

As the two-dimensional code generation procedure starts, the controller 105 functions as the white point determiner 111 to determine a white point (Step S1). In other words, the controller 105 determines a white point (a color temperature) that is the basis for color creation in the environment to output the two-dimensional code. For example, the controller 105 sets a color temperature of 6500 K (D65) as the white point.

After acquiring the white point, the controller 105 functions as the threshold acquirer 112 to acquire a threshold of the reading device represented in a device-independent color space that is based on the determined white point (Step S2). For example, when a color temperature of 6500 K (D65) is set as the white point, the controller 105 adopts the sRGB color space as the color space that is based on this color temperature. Then, the controller 105 acquires a value corresponding to, for example, the gradation number S1 or S2 shown in FIG. 8 as the threshold of the reading device represented in the sRGB color space.

After acquiring the threshold, the controller 105 functions as the logo image acquirer 114 to acquire a logo image (Step S3). In other words, the controller 105 acquires a logo image that is image data of a logomark to add to a two-dimensional code to generate via the operator 103, the communicator 104, or the like.

After acquiring the logo image, the controller 105 functions as the lightness acquirer 115 to Lab-convert the acquired logo image (Step S4) and obtain the lightness of parts within the logo image (Step S5). In other words, the controller 105 converts the acquired logo image to a logo image represented in the sRGB color space as a device-independent color space and further converts the logo image to a logo image represented in the Lab color space. Then, the controller 105 acquires the lightness of parts within the logo image by acquiring the value L obtained by converting the logo image into the Lab color space.

After acquiring the lightness of the logo image, the controller 105 functions as the two-dimensional code generator 113 to combine the logo image and generate a logo-included two-dimensional code (Step S6). The controller 105 generates, for example, the logo-included two-dimensional codes 11, 12, and 13 on which the logomarks 51, 52, and 53 are superimposed as shown in FIGS. 2 to 4.

After generating the logo-included two-dimensional code, the controller 105 judges the output environment of the generated logo-included two-dimensional code (Step S7). The controller 105 judges, specifically, whether to display on a monitor or print with a printer the generated logo-included two-dimensional code. The output environment is specified, for example, by the user via the operator 103.

In the case of displaying the generated logo-included two-dimensional code on a monitor (Step S7; MONITOR OUTPUT), the controller 105 functions as the two-dimensional code converter 116 to RGB-convert the generated logo-included two-dimensional code (Step S8). In other words, the controller 105 converts the logo-included two-dimensional code generated in the Lab color space to a logo-included two-dimensional code represented in an RGB color space as the monitor output color space.

On the other hand, in the case of printing the generated logo-included two-dimensional code with a printer in the Step S7 (Step S7; PRINT OUTPUT), the controller 105 functions as the two-dimensional code converter 116 to CMYK-convert the generated logo-included two-dimensional code (Step S9). In other words, the controller 105 converts the logo-included two-dimensional code generated in the Lab color space to a logo-included two-dimensional code represented in a CMYK color space as the color space for printing output.

After the CMYK conversion, the controller 105 functions as the halftone dot data generator 117 to generate halftone dot data from the CMYK-converted logo-included two-dimensional code (Step S10). At this point, in order to improve the reading accuracy of the reading device, the controller 105 generates halftone dot data so that any halftone dot is positioned at the center of each cell that is to be colored in a color of lightness lower than the threshold among multiple cells within the logo-included two-dimensional code as shown in FIG. 9.

As the generated logo-included two-dimensional code is ready for output after the RGB conversion or the CMYK conversion, the two-dimensional code generation procedure shown in the flowchart of FIG. 10 ends. The generated logo-included two-dimensional code is displayed on a desired monitor or printed with a desired printer.

As described above, the two-dimensional code generation device 100 according to this embodiment determines a white point in the environment to output a two-dimensional code and acquires the lightness of a logo image and a threshold of the reading device in a device-independent color space that is based on the determined white point. Then, the lightness of the logo image and the threshold of the reading device are compared and the logo image is combined with multiple cells constituting a two-dimensional code to generate a logo-included two-dimensional code on which the logo image is superimposed.

Consequently, the two-dimensional code generation device 100 according to this embodiment can generate a two-dimensional code that can be read stably by the reading device in various environments. Particularly, for generating a logo-included two-dimensional code with a design, the two-dimensional code generation device 100 according to this embodiment can eliminate necessity of changing the logo design for stabilizing the reading accuracy and because the cell dots superimposed on the logo can be smaller in area, can prevent the design of the two-dimensional code from being impaired. Thus, it is possible to generate a logo-included two-dimensional code stably readable independently from the device on which the two-dimensional code is presented or the like and having a design (designable).

The present disclosure is not confined to the above embodiment and various modifications and applications are available. Moreover, the components of the above-described embodiment can be combined on an arbitrary basis. Modifications of the above embodiment applicable to the present disclosure will be described below.

For example, the above embodiment is described using a color temperature of 6500 K (D65) and the sRGB color space as a device-independent color space. However, the two-dimensional code generation device according to the present disclosure can execute the above-described two-dimensional code generation procedure using another color temperature and another color space besides 6500 K and the sRGB color space. For example, when the color temperature in the two-dimensional code output environment is 9300 K (D93), the two-dimensional code generation device can use 9300 K as the color temperature and a device-independent color space supporting 9300 K as the color space.

Moreover, the two-dimensional code generation device 100 according to the above embodiment generates a logo-included two-dimensional code to which a logo is added. However, the two-dimensional code generation device according to the present disclosure may generate a two-dimensional code with no logo like, for example, the two-dimensional code 1 shown in FIG. 1. In other words, the two-dimensional code generation device according to the present disclosure may be a device configured more simply without the functions of the logo image acquirer 114 and the lightness acquirer 115. A two-dimensional code with no logo does not use as many colors as a logo-included two-dimensional code, whereby the reading accuracy is relatively stable. However, even for a two-dimensional code with no logo, the reading accuracy may drop depending on the environment. Thus, such a two-dimensional code generation device can generate a stably readable two-dimensional code with a more simplified configuration.

Moreover, in the above embodiment, the logo-included two-dimensional code is described using the gray scale for easier understanding. However, the logo-included two-dimensional code generated by the two-dimensional code generation device according to the present disclosure may be one expressed in full color. When the logo-included two-dimensional code is expressed in full color, it is possible to determine whether the lightness of a logomark and a cell is equal to or higher than a threshold or lower than the threshold by, for example, determining whether the average of RGB values is equal to or higher than a threshold.

Moreover, the above embodiment is described on the assumption that the two-dimensional code is a QR code (registered trademark). The present disclosure is not restricted thereto. The two-dimensional code may be another matrix-style two-dimensional code such as Data Matrix, Aztec code, Code One, Array Tag, Box Figure code, Maxi Code, Peri code, Soft Strip, CP code, Karura code, and Ultra code. Alternatively, the two-dimensional code may be a stacked two-dimensional code in which one-dimensional codes such as PDF417, Code 49, Code 16k, and Codablock are vertically stacked.

Moreover, the above embodiment is described on the assumption that the programs executed by the CPU are prestored in the ROM, the storage 102, and/or the like. The present disclosure is not restricted thereto. The programs for executing the above-described procedure may be applied to an existing general-purpose computer to function as the two-dimensional code generation device 100 according to the above embodiment.

Such programs are provided by any method and for example, may be saved and distributed on a non-transitory computer-readable recording medium (a flexible disc, a compact disc (CD)-ROM, a digital versatile disc (DVD)-ROM, and the like), or may be provided by saving the programs in a storage on a network such as the Internet and downloading the programs.

Furthermore, when the above procedure is executed by apportionment between an OS and an application program or cooperation of an OS and an application program, only the application program may be saved on a non-transitory recording medium or in a storage. Moreover, the programs can be superimposed on carrier waves and distributed via a network. For example, the above programs may be posted on a bulletin board system (BBS) on a network to distribute the programs via the network. Then, the programs may be activated and executed in a manner similar to other application programs under the control of an OS so that the above-described procedure is executed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 11, 12, 13 Two-dimensional code
2, 20, 21, 22, 23 Cell
2a, 2b, 2c, 2d, 2e, 2f Cell
3a, 3b, 3c Positioning symbol
11, 12, 13 Logo-included two-dimensional code
51, 52, 53 Logomark
6a, 6b, 6c, 6d, 6e, 6f, 60 Cell dot
7, 70 Halftone dot
100 Two-dimensional code generation device
101 Display
102 Storage
103 Operator
104 Communicator
105 Controller
111 White point determiner
112 Threshold acquirer
113 Two-dimensional code generator
114 Logo image acquirer
115 Lightness acquirer
116 Two-dimensional code converter
117 Halftone dot data generator

The invention claimed is:

1. A two-dimensional code generation device, comprising:
   a white point determiner to determine a white point in an environment to output a two-dimensional code;
   a threshold acquirer to acquire a threshold of lightness used by a reading device for reading multiple cells in binary, the threshold being represented in a device-independent color space that is based on the white point determined by the white point determiner, and the threshold varying depending on lightness that corresponds to a white color determined by the white point;
   a two-dimensional code generator to generate the two-dimensional code expressing information by a distribution pattern of multiple cell dots formed by coloring the multiple cells in a color of lightness equal to or higher than the threshold acquired by the threshold acquirer and in a color of lightness lower than the threshold,
   a logo image acquirer to acquire a logo image; and
   a lightness acquirer to, when the logo image acquired by the logo image acquirer is represented in a device-dependent color space, convert the acquired logo image into a logo image represented in the device-independent color space and acquiring lightness of each part within the logo image represented in the device-independent color space,
   wherein the two-dimensional code generator generates as the two-dimensional code a logo-included two-dimensional code on which the logo image is superimposed by
      superimposing cell dots colored in a color of lightness lower than the threshold on parts of the logo image that are superimposed on cells that are to be colored in a color of lightness lower than the threshold among the multiple cells and of which the lightness acquired by the lightness acquirer is equal to or higher than the threshold, and
      superimposing cell dots colored in a color of lightness equal to or higher than the threshold on parts of the logo image that are superimposed on cells that are to be colored in a color of lightness equal to or higher than the threshold among the multiple cells and of which the lightness acquired by the lightness acquirer is lower than the threshold.

2. The two-dimensional code generation device according to claim 1, wherein
   the two-dimensional code generator generates the logo-included two-dimensional code by
      superimposing, on parts of the logo image that are superimposed on cells that are to be colored in a color of lightness lower than the threshold among the multiple cells and of which the lightness acquired by the lightness acquirer is equal to or higher than the threshold, the cell dots smaller than the cells and colored in a color of lightness lower than the threshold, and
      superimposing, on parts of the logo image that are superimposed on cells that are to be colored in a color of lightness equal to or higher than the threshold among the multiple cells and of which the lightness acquired by the lightness acquirer is lower than the threshold, the cell dots smaller than the cells and colored in a color of lightness equal to or higher than the threshold.

3. The two-dimensional code generation device according to claim 2, wherein
   the two-dimensional code generator generates the logo-included two-dimensional code by
      superimposing the cell dots smaller than the cells and colored in a color of lightness lower than the threshold at positions of centers of the cells, and
      superimposing the cell dots smaller than the cells and colored in a color of lightness equal to or higher than the threshold at positions of centers of the cells.

4. The two-dimensional code generation device according to claim 1, further comprising:
   a two-dimensional code converter to convert the two-dimensional code generated by the two-dimensional code generator to a two-dimensional code represented in a color space of the environment to output the two-dimensional code.

5. The two-dimensional code generation device according to claim 4, wherein
   the two-dimensional code converter converts the two-dimensional code generated by the two-dimensional code generator to a two-dimensional code represented in a color space for printing output when the two-dimensional code is output by printing, and
   the two-dimensional code generation device further comprises a halftone dot data generator to generate halftone dot data expressing colors at positions within the two-dimensional code converted by the two-dimensional code converter by a size of halftone dots.

6. The two-dimensional code generation device according to claim 5,
   wherein the two-dimensional code generator generates the logo-included two-dimensional code on which the logo image is superimposed by superimposing, on parts of the logo image that are superimposed on cells that are to be colored in a color of lightness lower than the threshold among the multiple cells and of which the lightness acquired by the lightness acquirer is equal to or higher than the threshold, cell dots smaller than the cells and colored in a color of lightness lower than the threshold at positions of centers of the cells;

the two-dimensional code converter converts the logo-included two-dimensional code generated by the two-dimensional code generator into a logo-included two-dimensional code represented in a color space for printing output when the logo-included two-dimensional code is output by printing, and the halftone dot data generator generates the halftone dot data so that any halftone dot is positioned at a center of each cell that is to be colored in a color of lightness lower than the threshold among the multiple cells within the logo-included two-dimensional code converted by the two-dimensional code converter.

7. A two-dimensional code generation method, comprising:

a white point determination step of determining a white point in an environment to output a two-dimensional code;

a threshold acquisition step of acquiring a threshold of lightness used by a reading device for reading multiple cells in binary, the threshold being represented in a device-independent color space that is based on the white point determined by the white point determination step, and the threshold varying depending on lightness that corresponds to a white color determined by the white point;

a two-dimensional code generation step of generating the two-dimensional code expressing information by a distribution pattern of multiple cell dots formed by coloring the multiple cells in a color of lightness equal to or higher than the threshold acquired by the threshold acquisition step and in a color of lightness lower than the threshold, a logo image acquisition step of acquiring a logo image; and a lightness acquisition step of, when the logo image acquired by the logo image acquisition step is represented in a device-dependent color space, converting the acquired logo image into a logo image represented in the device-independent color space and acquiring lightness of each part within the logo image represented in the device-independent color space, wherein, in the two-dimensional code generation step, as the two-dimensional code a logo-included two-dimensional code is generated on which the logo image is superimposed by superimposing cell dots colored in a color of lightness lower than the threshold on parts of the logo image that are superimposed on cells that are to be colored in a color of lightness lower than the threshold among the multiple cells and of which the lightness acquired by the lightness acquisition step is equal to or higher than the threshold, and superimposing cell dots colored in a color of lightness equal to or higher than the threshold on parts of the logo image that are superimposed on cells that are to be colored in a color of lightness equal to or higher than the threshold among the multiple cells and of which the lightness acquired by the lightness acquisition step is lower than the threshold.

8. A non-transitory computer-readable recording medium storing a program making a computer execute:

a white point determination procedure to determine a white point in an environment to output a two-dimensional code;

a threshold acquisition procedure to acquire a threshold of lightness used by a reading device for reading multiple cells in binary, the threshold being represented in a device-independent color space that is based on the white point determined by the white point determination procedure, and the threshold varying depending on lightness that corresponds to a white color determined by the white point;

a two-dimensional code generation procedure to generate the two-dimensional code expressing information by a distribution pattern of multiple cell dots formed by coloring the multiple cells in a color of lightness equal to or higher than the threshold acquired by the threshold acquisition procedure and in a color of lightness lower than the threshold, a logo image acquisition procedure to acquire a logo image; and a lightness acquisition procedure to, when the logo image acquired by the logo image acquisition procedure is represented in a device-dependent color space, convert the acquired logo image into a logo image represented in the device-independent color space and acquiring lightness of each part within the logo image represented in the device-independent color space, wherein, in the two-dimensional code generation procedure, as the two-dimensional code a logo-included two-dimensional code is generated on which the logo image is superimposed by superimposing cell dots colored in a color of lightness lower than the threshold on parts of the logo image that are superimposed on cells that are to be colored in a color of lightness lower than the threshold among the multiple cells and of which the lightness acquired by the lightness acquisition procedure is equal to or higher than the threshold, and superimposing cell dots colored in a color of lightness equal to or higher than the threshold on parts of the logo image that are superimposed on cells that are to be colored in a color of lightness equal to or higher than the threshold among the multiple cells and of which the lightness acquired by the lightness acquisition procedure is lower than the threshold.

* * * * *